United States Patent [19]

Simpson

[11] Patent Number: 5,287,470
[45] Date of Patent: Feb. 15, 1994

[54] APPARATUS AND METHOD FOR COUPLING A MULTI-LEAD OUTPUT BUS TO INTERLEAVED MEMORIES, WHICH ARE ADDRESSABLE IN NORMAL AND BLOCK-WRITE MODES

[75] Inventor: Richard D. Simpson, Bedord, England

[73] Assignee: Texas Instruments Incorporated, Dallas, Tex.

[21] Appl. No.: 457,992

[22] Filed: Dec. 28, 1989

[51] Int. Cl.$^5$ .............................................. G06F 12/00
[52] U.S. Cl. ............................ 395/425; 364/DIG. 1; 395/164
[58] Field of Search ... 364/200 MS File, 900 MS File; 395/400, 425

[56] References Cited

U.S. PATENT DOCUMENTS

| | | | |
|---|---|---|---|
| 3,796,996 | 3/1974 | Curley et al. | 395/425 |
| 3,803,560 | 4/1974 | De Voy et al. | 395/575 |
| 4,254,463 | 3/1981 | Busby et al. | 395/400 |
| 4,807,189 | 2/1989 | Pinkham et al. | 365/189 |
| 4,823,286 | 4/1989 | Lumelsky et al. | 364/521 |
| 4,845,640 | 7/1989 | Ballard et al. | 395/165 |
| 4,958,303 | 9/1990 | Assarpour et al. | 364/521 |

*Primary Examiner*—Joseph L. Dixon
*Assistant Examiner*—Hiep T. Nguyen
*Attorney, Agent, or Firm*—Robert D. Marshall, Jr.; James C. Kesterson; Richard L. Donaldson

[57] ABSTRACT

A circuit and method of operation for controlling block-write operations to interleaved memories is disclosed which includes first and second interleave banks of memories, each memory addressable in a normal mode in a block-write mode. Each memory has a plurality of input nodes for receiving data in a normal mode, ones of the input nodes operable to receive data in the block-write mode and other ones of said input nodes not used in the block-write mode. Coupling circuitry couples leads from an output bus to input nodes of the first bank memories which are operable to receive data in the block-write mode and to input nodes in the second bank of memories which are not used in the block-write mode.

14 Claims, 9 Drawing Sheets

FIG. 6

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| 7 | 7 | 7 | 7 | 6 | 6 | 6 | 6 | 5 | 5 | 5 | 5 | 4 | 4 | 4 | 4 | 3 | 3 | 3 | 3 | 2 | 2 | 2 | 2 | 1 | 1 | 1 | 1 | 0 | 0 | 0 | 0 |

SWIZZLE CORESPONDENCE

| INPUT | OUTPUT |
|---|---|
| 0 | 0 |
| 1 | 4 |
| 2 | 8 |
| 3 | 12 |
| 4 | 16 |
| 5 | 20 |
| 6 | 24 |
| 7 | 28 |
| 8 | 1 |
| 9 | 5 |
| 10 | 9 |
| 11 | 13 |
| 12 | 17 |
| 13 | 21 |
| 14 | 25 |
| 15 | 29 |
| 16 | 2 |
| 17 | 6 |
| 18 | 10 |
| 19 | 14 |
| 20 | 18 |
| 21 | 22 |
| 22 | 26 |
| 23 | 30 |
| 24 | 3 |
| 25 | 7 |
| 26 | 11 |
| 27 | 15 |
| 28 | 19 |
| 29 | 23 |
| 30 | 27 |
| 31 | 31 |

FIG. 7

FIG. 12
SWIZZLE CORESPONDENCE

| INPUT | OUTPUT |
|---|---|
| 0 | 0 |
| 1 | 8 |
| 2 | 16 |
| 3 | 24 |
| 4 | 4 |
| 5 | 12 |
| 6 | 20 |
| 7 | 28 |
| 8 | 1 |
| 9 | 9 |
| 10 | 17 |
| 11 | 25 |
| 12 | 5 |
| 13 | 13 |
| 14 | 21 |
| 15 | 39 |
| 16 | 2 |
| 17 | 10 |
| 18 | 18 |
| 19 | 26 |
| 20 | 6 |
| 21 | 14 |
| 22 | 22 |
| 23 | 30 |
| 24 | 3 |
| 25 | 11 |
| 26 | 19 |
| 27 | 27 |
| 28 | 7 |
| 29 | 15 |
| 30 | 23 |
| 31 | 31 |

FIG. 13
DATA BUS CONNECTIONS

| DATA BUS | BANK1 | | BANK2 | |
|---|---|---|---|---|
| | VRAM | PIN | VRAM | PIN |
| 0 | 1 | 0 | 1 | 4 |
| 1 | 1 | 1 | 1 | 5 |
| 2 | 1 | 2 | 1 | 6 |
| 3 | 1 | 3 | 1 | 7 |
| 4 | 1 | 4 | 1 | 0 |
| 5 | 1 | 5 | 1 | 1 |
| 6 | 1 | 6 | 1 | 2 |
| 7 | 1 | 7 | 1 | 3 |
| 8 | 2 | 0 | 2 | 4 |
| 9 | 2 | 1 | 2 | 5 |
| 10 | 2 | 2 | 2 | 6 |
| 11 | 2 | 3 | 2 | 7 |
| 12 | 2 | 4 | 2 | 0 |
| 13 | 2 | 5 | 2 | 1 |
| 14 | 2 | 6 | 2 | 2 |
| 15 | 2 | 7 | 2 | 3 |
| 16 | 3 | 0 | 3 | 4 |
| 17 | 3 | 1 | 3 | 5 |
| 18 | 3 | 2 | 3 | 6 |
| 19 | 3 | 3 | 3 | 7 |
| 20 | 3 | 4 | 3 | 0 |
| 21 | 3 | 5 | 3 | 1 |
| 22 | 3 | 6 | 3 | 2 |
| 23 | 3 | 7 | 3 | 3 |
| 24 | 4 | 0 | 4 | 4 |
| 25 | 4 | 1 | 4 | 5 |
| 26 | 4 | 2 | 4 | 6 |
| 27 | 4 | 3 | 4 | 7 |
| 28 | 4 | 4 | 4 | 0 |
| 29 | 4 | 5 | 4 | 1 |
| 30 | 4 | 6 | 4 | 2 |
| 31 | 4 | 7 | 4 | 3 |

## APPARATUS AND METHOD FOR COUPLING A MULTI-LEAD OUTPUT BUS TO INTERLEAVED MEMORIES, WHICH ARE ADDRESSABLE IN NORMAL AND BLOCK-WRITE MODES

TECHNICAL FIELD OF THE INVENTION

This invention relates to block-write graphic control data memory write systems and more particularly to an arrangement which supports the block-write function into interleaved memories.

CROSS REFERENCE TO RELATED APPLICATIONS

All of the following patent applications are cross-referenced to one another, and all have been assigned to Texas Instruments Incorporated. These applications are copending and are hereby incorporated in this patent application by reference.

| U.S. Pat. No. Ser. No. | Title |
| --- | --- |
| 387,568 | Video Graphics Display Memory Swizzle Logic and Expansion Circuit and Method, filed July 28, 1989. |
| 898,398 | Video Graphics Display Memory Swizzle Logic Circuit and Method, B2 filed July 28, 1989 and now abandoned. |
| 387,459 | Graphics Floating Point Coprocessor Having Matrix Capabilities, filed July 28, 1989. |
| 939,957 | Graphics Processor Trapezoidal Fill Instruction Method and Apparatus, B2 filed July 28, 1989 and now abandoned. |
| 387,550 | Graphic Processor Three-Operand Pixel Transfer Method and Apparatus, B4 filed July 28, 1989 and now abandoned. |
| 783,727 | Graphics Processor Plane Mask Mode Method and Apparatus, B5 filed July 28, 1989 and now abandoned. |
| 386,936 | Dynamically Adaptable Memory Controller For Various Size Memories, filed July 28, 1989. |
| 387,472 | Graphics Processor Having a Floating Point Coprocessor, filed July 28, 1989 and now abandoned. |
| 5,161,122 | Register Write Bit Protection Apparatus and Method, filed July 28, 1989. |
| 387,569 | Graphics Display Split-Serial Register System, filed July 28, 1989 and now abandoned. |
| 387,455 | Multiprocessing Multiple Priority Bus Request Apparatus and Method, filed July 28, 1989 and now abandoned. |
| 387,325 | Processing System Using Dynamic Selection of Big and Little Endian Coding, filed July 28, 1989 and now abandoned. |
| 735,203 | Graphics Processor Nonconfined Address Calculation System, B6 filed July 28, 1989 and now abandoned. |
| 386,850 | Real Time and Slow Memory Access Mixed Bus Usage, filed July 28, 1989 and now abandoned. |
| 387,479 | Graphics Coprocessor Having Imaging Capability, filed July 28, 1989 and now abandoned. |
| 387,255 | Graphics Floating Point Coprocessor Having Stand-Alone Graphics Capability, filed July 28, 1989 and now abandoned. |
| 387,243 | Graphics Floating Point Coprocessor Having Vector Mathematics Capability, filed |

-continued

| U.S. Pat. No. Ser. No. | Title |
| --- | --- |
| | July 28, 1989. |

BACKGROUND OF THE INVENTION

Microprocessors intended for graphics applications must be able to move pixel information between memory bit maps as quickly as possible. In situations where many pixels must be transferred to a bit map, the transfer may be speeded up by using a block-write feature. Typically, a block-write is created by associating a color register with each VRAM, filling the color register with bits to determine the desired color value of selected portions of the VRAM, and then using both the address bits of the VRAM as well as the data bus input to the VRAM to determine the locations within the VRAM where the color represented by the value in the color register will appear. This technique does not burden the data bus with multiple copies of the same pixel value and thus increases the available memory bandwidth, again speeding up data transfers.

The simplest application where the block-write can be used to advantage is the fill, which transfers the same pixel value into a defined area of memory. Also, some forms of data expansion are well suited to the application of block-write techniques. Thus, when a bit map is stored in compressed form the 1's and 0's can represent the presence or absence of a pixel and block-writes can be used to decompress the bit map. Typically, this sort of expansion is applied to character fonts which are often stored in compressed form to save memory.

Problems arise because memory accesses must be made in regular mode and in block-write mode via the same bus and they must be consistent such that data written (or read) in one mode must be able to be read (or written) in the other mode. This problem is addressed in U.S. patent application Ser. No. 898,398, referenced above and incorporated by reference herein.

Another problem occurs where interleaving banks of memories are used. An interleaved memory is one in which banks of memory are arranged such that the least bit (or bits) of the word address are used to select between the banks. For example, in a 32-bit data bus system, with two interleaved banks, the first thirty-two bits of data are contained in the first bank of memory and the next thirty-two bits of data are contained in the second bank of memory. The third 32-bits of data are contained in the first bank and the fourth 32-bits are contained in the second bank. Hence, the bank where the data is contained alternates every other word (in this example, 32-bit words are used).

One way to think of an interleaved memory is a 64-bit wide memory bank, wherein the processor can only access 32-bits of data at a time, so the data bus goes to both halves. The half actually accessed by the processor in any one cycle is determined by the least significant bit of the address.

Interleaving is generally used in graphic systems in order to make possible a higher pixel bandwidth. With two-way interleaving, 64-bits of pixel data are available every shift clock cycle. This high data rate is needed to support high resolution screens.

In block-write mode, however, the processor tries to address and control one hundred twenty-eight consecutive bits (four 32-bit words) in a single cycle. The 128-bits will be spread out between two banks, bits 0-31 and 64-95 in bank0 and 32-63 and 96-127 in bank1. At 8-bit/pixel, pixel 0 and pixel 4 are in the same memory locations within each bank, and thus cannot be controlled individually during the same cycle. If both banks are enabled to be written to, which they must be to access one hundred twenty-eight consecutive bits, then the same data will go into both banks. Control of individual pixels and different banks would thus be impossible.

Therefore, a need exists in the art for a method of supporting interleaved memory banks in a block-write mode.

SUMMARY OF THE INVENTION

In accordance with the present invention, a processing system is provided which substantially eliminates the problems associated with the prior art.

The processing system of the present invention comprises first and second interleaved banks of memories, each memory addressable in a normal mode and a block-write mode, and each memory having a plurality of input nodes for receiving data in the normal mode. One or more of the input nodes of the memories are also operable to receive data in a block-write mode; the other input nodes are not used in the block-write mode. An output bus has a plurality of leads, some of which are connected to the input nodes in the memories of the first bank which are operable to receive data in block-write mode and are also connected to inputs nodes in the memories of the second bank which are not used in the block-write mode.

The processing system of the present invention provides the advantage that data used to control the block-write functions in the first memory bank do not affect the block-write functions in the second memory bank. Further, the present invention allows both banks to be operating in block-write mode simultaneously thereby providing an increased bandwidth. Normal-mode operations are not affected.

BRIEF DESCRIPTION OF THE DRAWINGS

For a more complete understanding of the present invention and further advantages thereof, reference is now made to the following Detailed Description, taken in conjunction with the accompanying drawings, in which:

FIG. 6 shows a four position expansion;

FIG. 7 shows the swizzle circuit cross-connections for all situations;

FIG. 12 shows the swizzle circuit cross-connections; and

FIG. 13 shows the connections between the data bus and the interleaved banks.

DETAILED DESCRIPTION OF THE INVENTION

Figure 1:
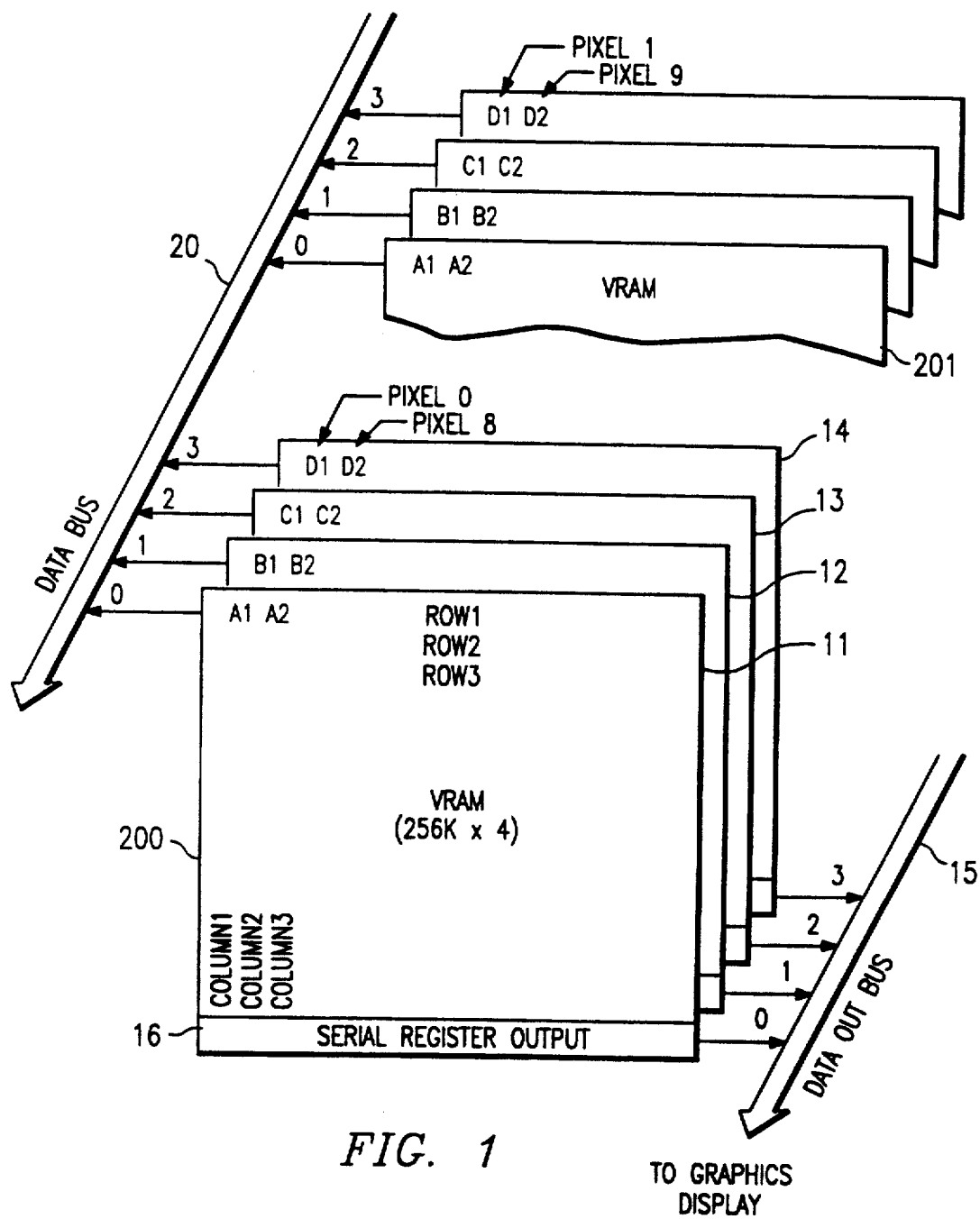
FIG. 1 shows a stylized view of a VRAM memory.

Turning now to FIG. 1, a brief discussion of the memory structure of a typical graphics memory system is in order before progressing to the actual detailed description of the functioning of the embodiment of this invention. While there are many memory structures and systems which could be used, in the preferred embodiment it is typical to use a structure such as shown in FIG. 1 which uses eight VRAM memories 200, 201, etc. in an array. Each VRAM memory or unit has a 4-bit data port which can be treated as having planes 11, 12, 13 and 14. The construction of each plane is such that a single data lead is used to write information to that plane. These leads are labeled 0, 1, 2, and 3 for each plane. In a system that uses a 32-bit data bus, such as data bus 20, there would be eight VRAM memories (two of which are shown in FIG. 1) each memory having four data leads connected to the data bus.

Figure 2:
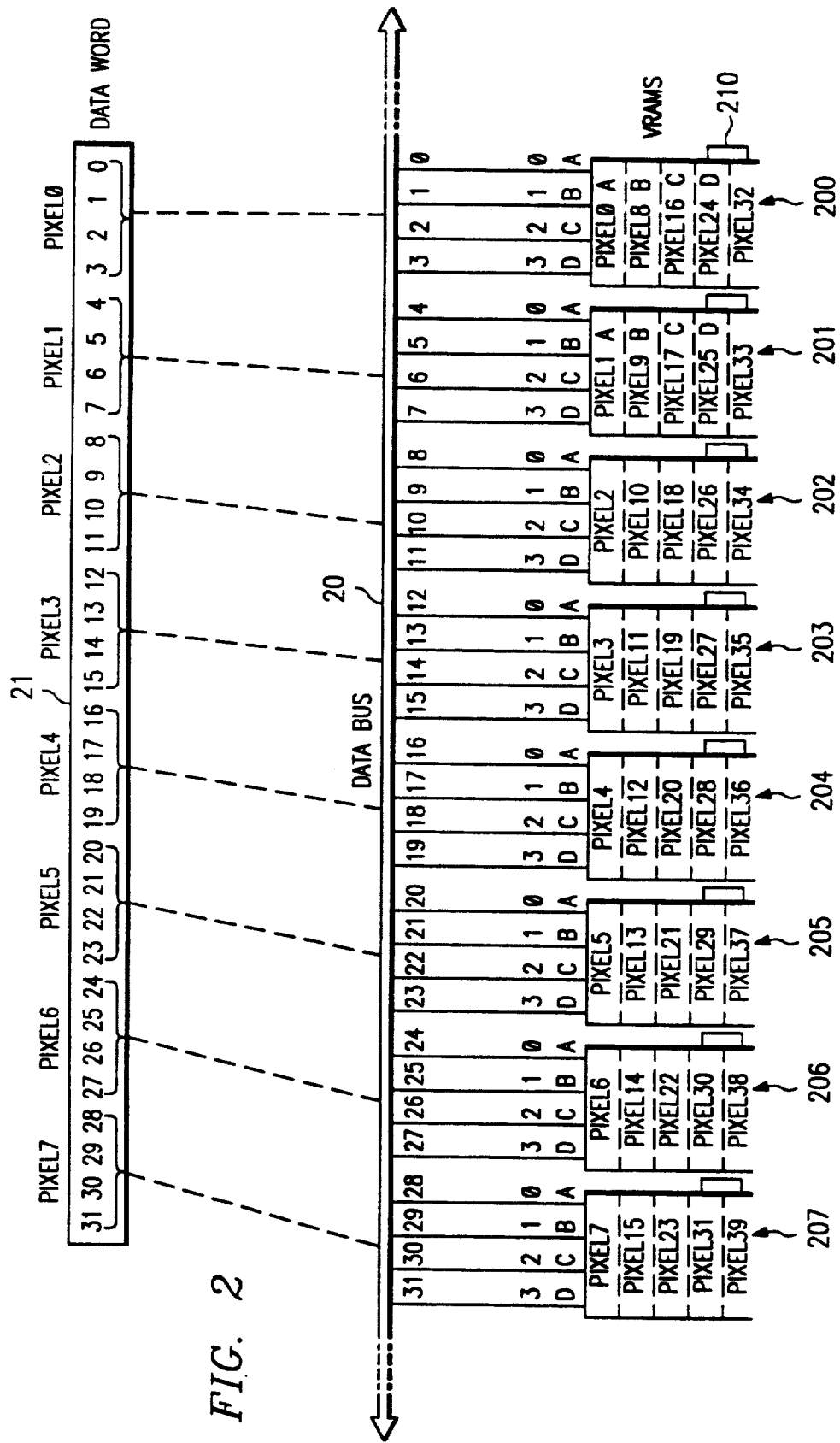
FIG. 2 shows a VRAM memory connection to a data bus.

Thus, for a 32-bit data bus VRAM memory 200 would have its four data leads connected to data bus leads 0, 1, 2, 3, respectively. Likewise, VRAM memory 201 would have its four leads 0, 1, 2, 3 connected to data bus leads 4, 5, 6, 7, respectively. This continues for the remaining six VRAM's such that the last VRAM has its leads connected to leads 28, 29, 30, 31 of bus 20. The full set of connections is shown in FIG. 2.

Continuing with FIG. 1, the memories are arranged such that the pixel information for the graphics display is stored serially across the planes in the same row. Assuming a 4-bit per pixel system, then successive pixels are stored in successive VRAMs. In such a situation pixel 0 would be in VRAM 200, and pixel 1 would be in VRAM 201. The pixel storage for pixels 2 through 7 are not shown in FIG. 1 but are shown in FIG. 2. The pixel information for pixel 8 then would be stored in VRAM 200, still in row 1 but in column 2 thereof. The reason for this arrangement of pixel information will be more fully appreciated from an understanding of how information is retrieved from the memory.

Continuing with FIG. 1, each VRAM plane has a serial register 16 for shifting out information from a row of memory. The outputs from these registers are connected to data out bus 15 in the same manner as the data input leads are connected to the data input bus. Thus, data from a row of memory, say row 1, would be moved into register 16. This would occur for each plane of the eight memory array.

Looking at data output bus 15 at an instant of time, the first bit in each shift register would be on the bus. Thus assuming row 1 was being outputted to the bus, the bus would have on its lead 0 the row 1, bit A1 of memory 200. Output bus 15 lead 1 would have on it row 1, bit B1; lead 2 would have row 1, bit C1; and lead 3 would have on it row 1, bit D1. These bits would be followed by memory 201 row 1 bits, A1, B1, C1, D1 on leads 4, 5, 6, 7, respectively. Thus, at a first instant of time, data out bus 15 would have on it the four bits forming pixel 0 followed by the four bits forming pixel 1, followed by the four bits forming pixel 2. This would continue until the 32-bits forming the eight pixels 0-7 were on the consecutive leads of data out bus 15. These bits would be supplied to the graphics display and the shift registers would all shift one position providing the bus with pixel information for the next eight pixels, namely pixels 8 through 15. This shifting would then continue until the entire line was shifted out and then a new line would be selected for loading into the output register. For a more detailed description of the operation of a VRAM and its block-write mode, see U.S. Pat. No. 4,807,189, issued Feb. 21, 1989, which patent is incorporated by reference herein.

Up to this point we have assumed that the bit information per pixel is 4-bits. If the pixel information were to be, say 8-bits, then two 4-bit wide VRAMs would have to be used for each pixel. This would change the bit patterns somewhat. This aspect of the invention will be discussed in further detail hereinafter. Also, it should be noted that memory sizes and structures continue to vary and the size and structure shown are only for illustrative purposes and this invention can be used with many different memory configurations and with different pixel sizes.

It must be noted that the depiction of memory in FIGS. 2 through 5 is a one-dimensional representation of what is conceptually a three-dimensional array as shown in FIG. 1. Therefore, from this point, on the term "row" refers to the set of pixels addressed at any one time from the bus.

Turning now to FIG. 2, a full eight VRAM memory arrangement is shown with the information for controlling pixels 0-7 contained in the top row of VRAMs 200 through 207, while pixels 8 through 15 are in row 2, and pixels 16 through 23 are in row 3, and pixels 24 through 31 are in row 4. This arrangement continues for each additional row of memory.

For normal write operations to the VRAM memory, bits of data are received over data bus 20. The position of the information on the bus determines where the data is to be stored in the VRAMs. Thus, a bit on lead 0 of bus 20 goes onto lead 0 of VRAM 200. Assuming the address location of the first row of VRAM 200 has also been selected, that bit information would become associated with bit 0 of pixel 0. This is the well known traditional operation of graphics systems and details of this operation will not be undertaken here. It is sufficient for our understanding of this invention to note that a given data word, such as data word 21, has bits in ordinate position and these bits will be transferred directly to the proper bit positions within the VRAMs because of the physical connections and associations between the data bus and the VRAMs. Also note that information in ordinate positions 0-3 of data word 21 can go, via bus 20, to one of many pixels 0, 8, 16, 24, 32, etc. The actual storage location will depend upon other concurrent addressing to the VRAMs, all of which is not shown here but is well known in the art.

The method of presentation of data as described above requires 32-bits of data, and a full memory write cycle for each row (8 pixels). In some situations, for example, when a background color is to be painted on a screen, many pixels will have the same information written to them. The block-write method of loading a VRAM has been devised to handle this situation. This operation, which is well known in the art, uses a special register on each VRAM, such as register 210 shown in conjunction with VRAM 200, which contains bits for transfer to selected pixel locations within memory. These bits are loaded prior to the start of any block-write operation.

During the block-write operation the memory is loaded in a manner different from normal loading. The four data input leads are used, but this time each bit controls the transfer of the special register bits to a particular memory row in that VRAM. For example, in VRAM 200 assume it is desired to load pixels 0, 8 and 24 with the bits from register 210 while leaving pixel 16 unchanged. In this situation, leads 0, 1, 3 would have logical 1's thereon while lead 2 would contain a logical 0. This same situation would prevail for the entire 32-bit bus in that the ordinate position of the bits would determine whether or not information is to be transferred into a corresponding pixel in a corresponding VRAM memory row. This, it will be appreciated, is different from the normal loading of data where the data itself comes from the data bus. For block-write operations, the data comes from the special registers associated with each VRAM and the bits on the data bus merely give on-off or load-not load control depending upon their position on the various leads of the bus.

The data word that controls this operation is then said to be in compressed format such that the ordinate position of each bit being either a 1 or 0 controls a function. Also it should be noted that 1 and 0 representing on and off, respectively, is merely illustrative and the reverse may be true also.

Figure 3:
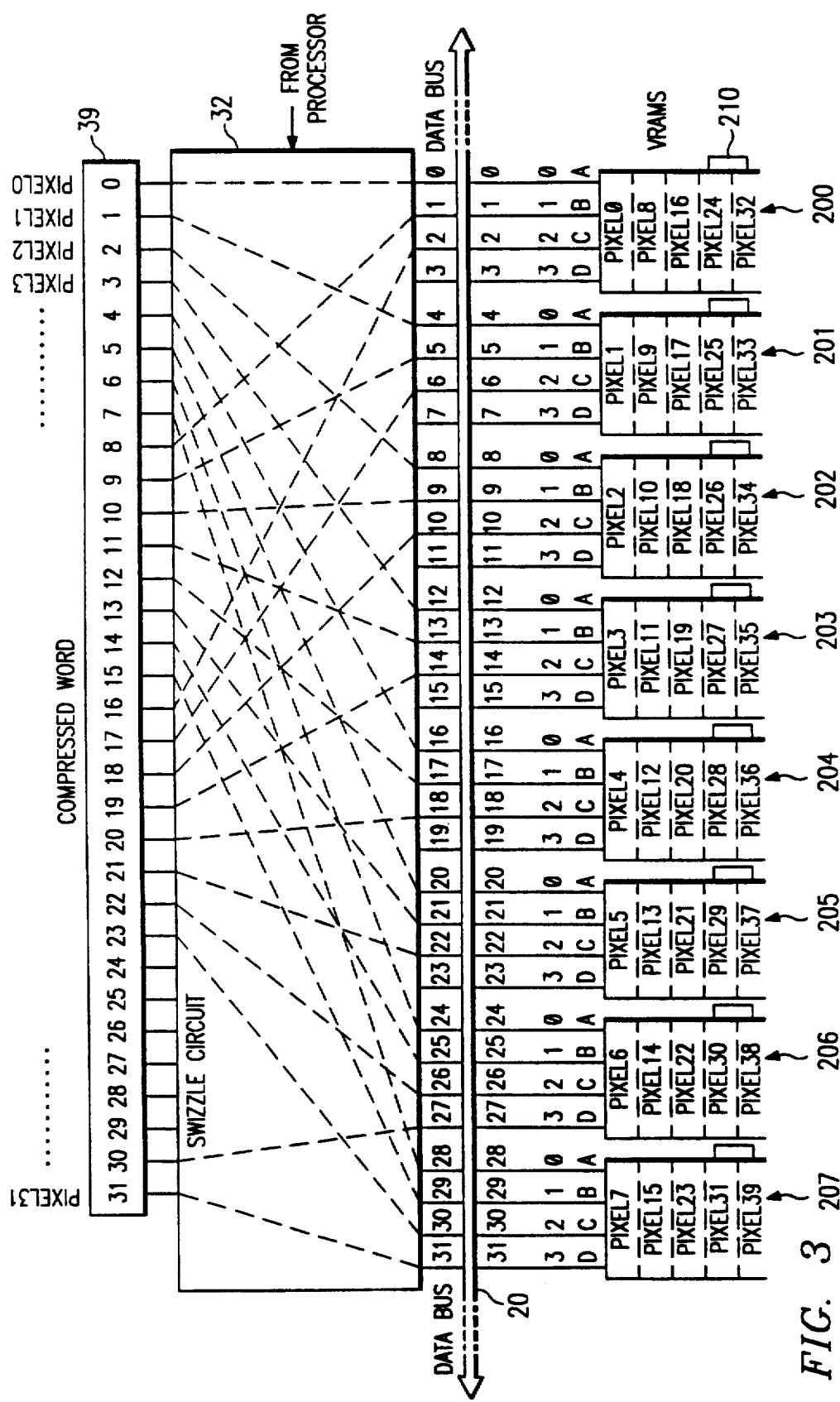
FIG. 3 shows a swizzle circuit connected to the data bus.

Turning now to FIG. 3, it will be seen that compressed data word 31 has ordinate positions 0-31 which must be presented to the VRAMs to control various pixels in accordance with the ordinate position of the data in the word. Thus, pixel 0 is to be controlled by compressed data bit 0, while pixel 1 is to be controlled by compressed data bit 1. In this manner, compressed data bit 31 should then control pixel 31. This is easier said than done.

Pixel 0 is easy since it is controlled by lead 0 of VRAM 200 which is connected to compressed bit 0. However, the bit in position 1 of compressed data word 39 begins the problem. In FIG. 2 this non-compressed bit is connected to pin 1 of VRAM 200. However, as discussed above, the bit in compressed data ordinate position 1 is used to control the writing of information from the special register into pixel 1. Pixel 1 is controlled, in turn, by a 1 or 0 on lead 1 of VRAM 201. This lead, in turn, is connected to lead 4 of bus 20. A comparison of FIGS. 2 and 3 will show that in one situation bit position 1 of the input data word goes to lead 1 of bus 20 while in the other situation it goes to lead 4. Thus, clearly a reordering of bits is necessary when compressed words are used to control data transfer in the block-write mode.

This reordering is accomplished by swizzle circuit 32 which is interposed between the compressed data input and the actual data bus. Swizzle circuit 32 is controlled by the processor to allow data to flow straight through, as would be the situation for FIG. 2, or to reorder the leads in a certain pattern as is required for FIG. 3. This arrangement does not require processor time to rearrange information, but rather establishes a pattern based on the physical structure of the memory bus arrangement and calls upon that structure whenever a block-write operation is invoked.

The swizzle circuit could be hard wired or could be software controlled within or outside of the processor.

Now let us assume that instead of four bits per pixel it is desired to use eight bits per pixel and retain a 32-bit data bus. Also let us assume that we continue using VRAMs having four planes per unit as discussed with respect to FIG. 1. In such a situation the reordering of the bits from the compressed word would be different than it was when only four bits per pixel were used.

Figure 4:
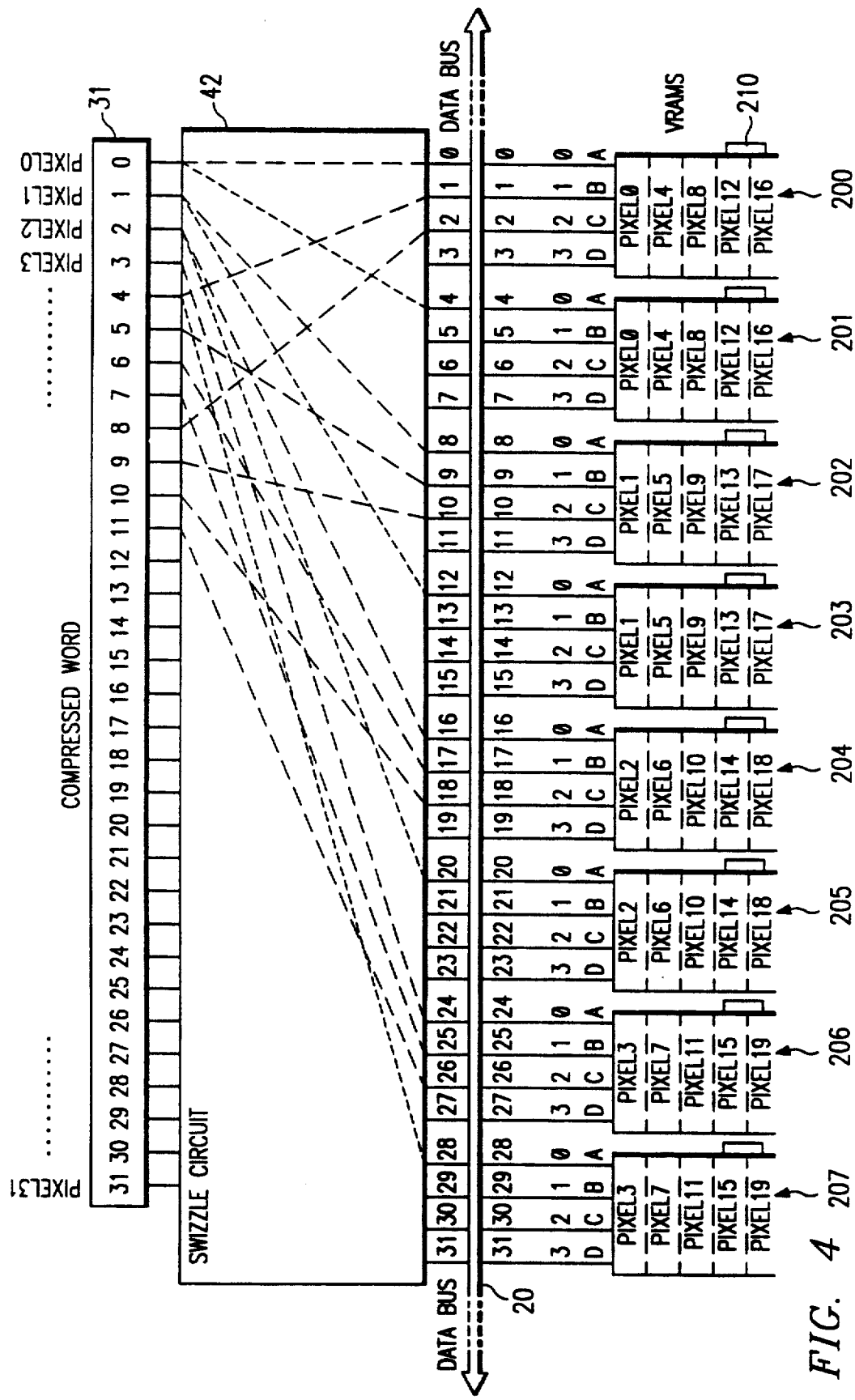
FIGS. 4 and 5 show partial connections for alternate swizzle circuits.

This can easily be seen in FIG. 4 where VRAMs 200 and 201 now both contain pixel 0 information, while VRAMs 202, 203 contain pixel 1 information.

It follows then that while again compressed data bit 0 continues to be associated with lead 0 of VRAM 200, all the other ordinate positions of the compressed word are associated with different leads of the bus. Take for example compressed word ordinate position 2. In FIG. 3, compressed data word ordinate position 2 is associated with pixel 2 and bus lead 8. However, in FIG. 4 the association is with bus lead 16. This then argues for a separate swizzle for systems where there is different pixel configurations. Also, since half of each pixel is contained in a separate VRAM, both halves are controlled by the same compressed data control bit. Thus, each compressed data control bit must be duplicated once for each additional VRAM which contains part of a given pixel. This also argues different swizzles for each pixel configuration.

From FIG. 4 it is clear that because each bit of the compressed word connects to two VRAM inputs that only sixteen bits of the compressed word will control all of the VRAMs in a 32-bit bus configuration. The first system for solving this problem is to maintain the 32-bit bus and take two bus cycles to use both halves of the 32-bit compressed word. The other option is to use all 32-bits of the compressed word which expands the data bus to sixty-four bits.

Figure 9:
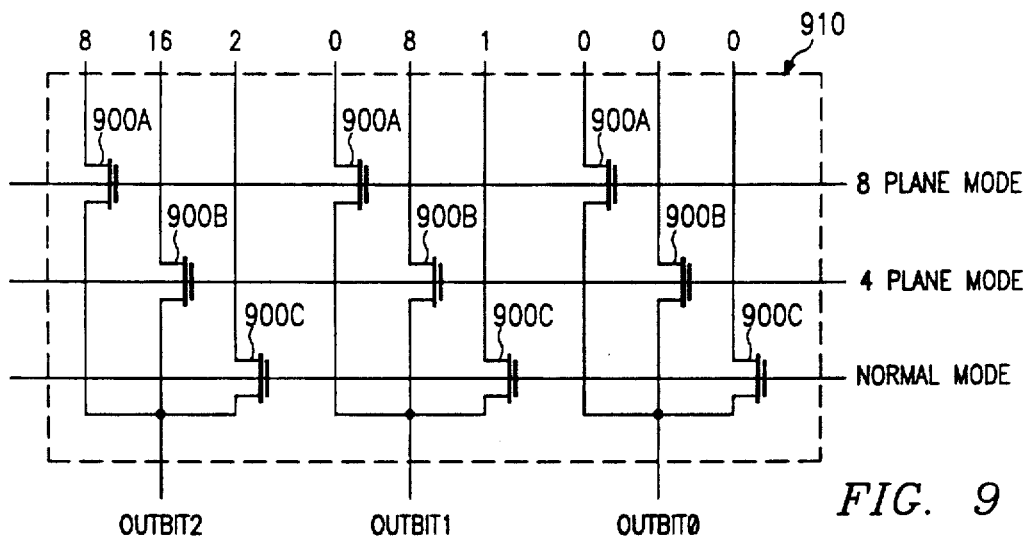
FIG. 9 shows an embodiment of a swizzle circuit used for several different memory configurations.

FIG. 9 shows a schematic diagram of how a simple multiplexer would achieve the required swizzle for output bits 0, 1, and 2 for supporting the four plane and eight plane modes of the preferred embodiment. In normal mode the multiplexer function simply passes the corresponding bit position from input to output (i.e. 0 to 0, 1 to 1, and 2 to 2). For the four plane mode selection, the input to output connections are made as outlined in FIG. 4 (0 to 0, 8 to 1, 16 to 2). For the eight plane selection, the connections are made as outlined in FIG. 5 (0 to 0, 0 to 4, 8 to 2). Of course, other multiplexer functions could be made to support other numbers of planes and different bus organizations.

While in the preferred embodiment, the swizzle function is performed by multiplexer hardware function, other means such as a software based table look-up method could be used to perform the swizzle.

Figure 5:
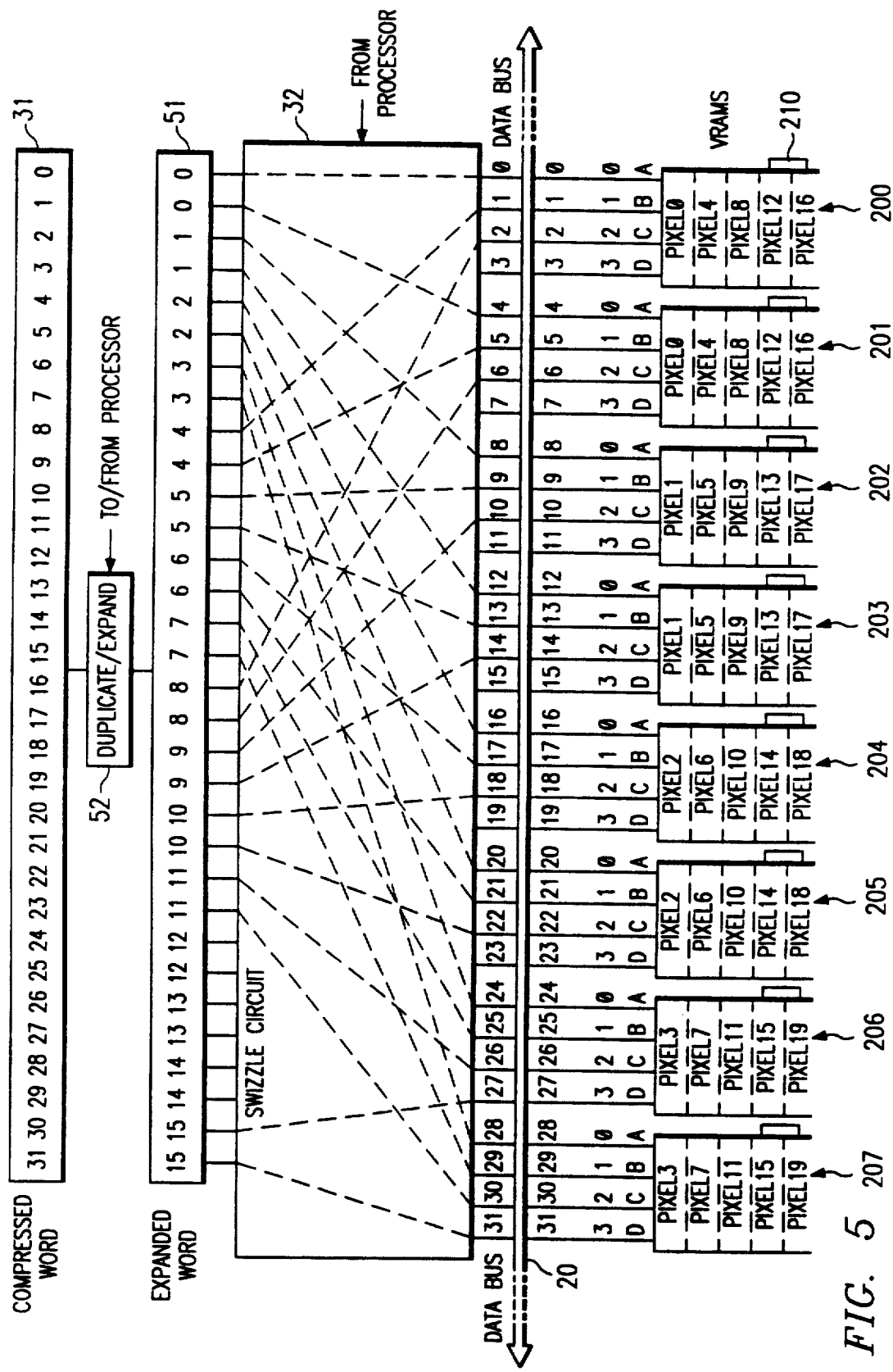

Turning to FIG. 5, it is seen that expanding the compressed word by duplicating each bit corresponding to the number of VRAMs used per pixel will result in the ability to use the same swizzle circuit for different memory/pixel configurations. This solution, as performed by duplicating/expansion circuit 52 has the effect of also activating both VRAMs of a given pixel, since the color information must be provided to all pixel bits even when these bits are positioned within two VRAMS.

The essence of the operation is the fact that the duplication and expansion occurs prior to the swizzle operation, thereby allowing the same swizzle configuration for both operations. In typical operations the same configuration would be used for any given system and thus only one determination of duplication/expansion need be made. However, situations may arise where more than one VRAM system configuration is controlled by the same processor, and thus dynamic control can be required. This can easily be achieved by arranging duplicate/expansion circuit 52 to function under control of the system processor on a case by case basis.

Duplicate/expansion circuit 52 can be any type of register circuit or processor that can reorder and pad numbers. This can be operated by microcode under control of the main processor or by a special processor or can be performed by a host processor if desired. The function performed by circuit 52 is mathematical in nature and thus one skilled in the art can easily devise many arrangements to perform the desired function.

Circuit 52 can be system adaptable to change the duplicating and expansion function on a dynamic basis in response to received data or in response to a flag in a register to allow for changing pixel/memory configurations. Thus, for a pixel size of sixteen bits and a VRAM of the same size as shown in FIG. 1, namely four bits, four VRAMS would be used for each pixel and thus the expansion would be by four bits. In this situation, as shown in FIG. 6, expanded word 61 would have the data from compressed bit ordinate position 0 expanded into ordinate positions 0, 1, 2, 3 of the expanded word. In this situation the data from compressed ordinate position 1 would be expanded into ordinate bit positions 4, 5, 6, 7, and so forth.

It can be seen from the chart in FIG. 7 that the duplicated data at the inputs 0, 1, 2, 3 of the swizzle circuit go to outputs 0, 4, 8, 12. From FIG. 4 it can be seen that these outputs go to VRAMS 200, 201, 202, 203 which are the four VRAMS which would hold pixel 0 if that pixel were to be sixteen bits long.

The compressed word is provided in a register such that it can be rotated through all thirty-two bits for any given memory clock cycle regardless of how many bits are expanded. This allows for continuous system operation without regard to pixel size. This also allows for total flexibility of memory storage to allow for starting and stopping at any given pixel boundary.

Figure 8:
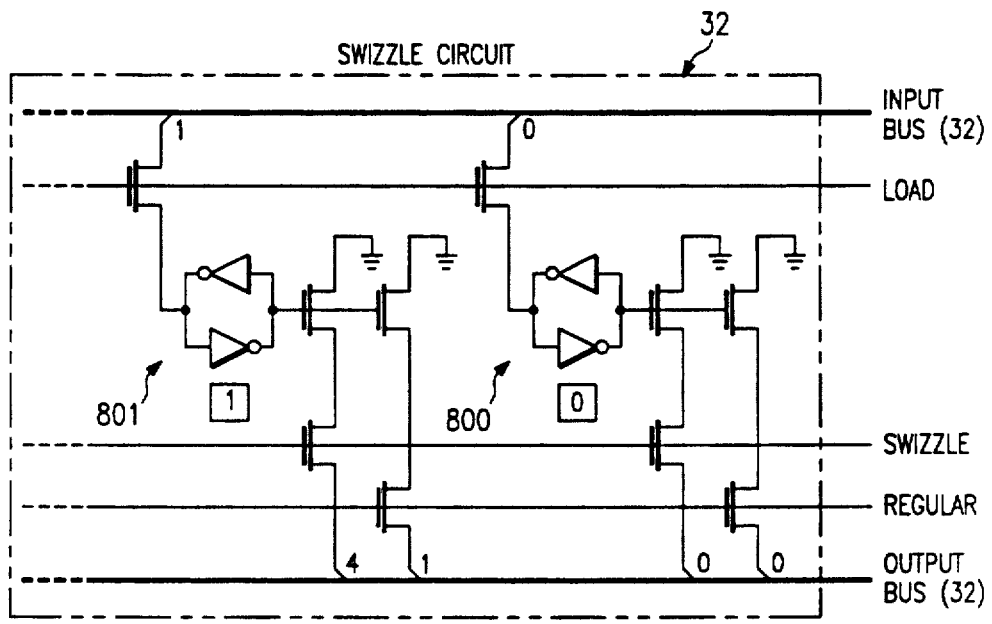
FIG. 8 shows one embodiment of a swizzle circuit.

FIG. 7 shows the input to output correspondence of swizzle circuit 32 when the swizzle circuit is in the swizzle mode. It should be realized that each input has two possible outputs: the swizzle output, as shown, and the straight-through output, which is not shown. Of course, the straight-through output has input 0 connected to output 0, with input 1 connected to output 1, input 2 connected to output 2, and so forth. A switching circuit is used to switch between the straight-through arrangement of the swizzle circuit and the swizzle mode of the swizzle circuit. FIG. 8 shows one embodiment of the swizzle circuit 32 where registers 0 and 1 are shown for positions 0 and 1.

As shown in FIG. 8, the input bus has thirty-two leads, and the output bus also has thirty-two leads. Between these leads are a number of latches, two of which, 800 and 801, are shown. Each latch has a single input connected to an individual input bus lead and two outputs connected to the straight-through correspondence and to the swizzle correspondence in accordance with FIG. 7. The latches load in a straightforward manner from information on the input bus upon the signal provided on the load lead. For the straight-through operation, a signal is provided on the REGULAR lead, and the outputs from the latches are clocked straight through the swizzle circuit with straight-through correspondence, as noted above. However, when swizzle circuit 32 is being utilized in the swizzle mode, the SWIZZLE lead is pulsed, and this serves to switch the outputs. For example, with respect to latch 801, in the straight-through mode, latch 801 is connected to lead 1 of the output bus. However, in the swizzle mode, as can be seen, another output from latch 1 is connected to lead 4 of the output bus. All of the latches of swizzle circuit 32 are wired with this correspondence such that the swizzle output lead of each latch is connected as shown in FIG. 7 to the output bus lead. This arrangement allows for the selective control of swizzle circuit 32 in the straight-through mode or the swizzle mode, under control of the system processor.

The circuit shown in FIG. 8 can be expanded to cover the multiple swizzles required for swizzle circuit 42. In this situation, an extra controlled output lead would extend from each latch to a different output. In this mode a second swizzle control signal would extend to control multiple outputs from each latch, the number of multiples being a function of the number of VRAMs containing the same pixel information.

While the circuit and method shown here has been described in terms of the block-write operation of a graphics processing system it can be used in numerous other situations where ordinate coordination is required for controlling physical adaptations. It should be noted that the circuitry, including the swizzle circuit and processor, could be integrated into a single chip.

Figure 10:
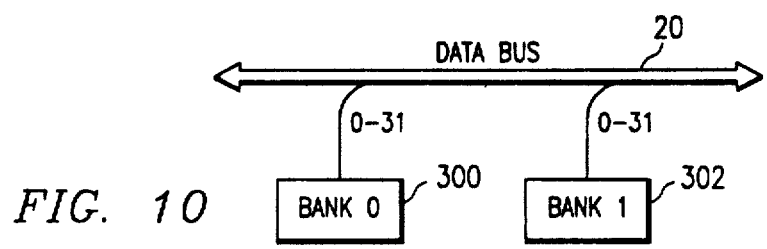
FIG. 10 shows a block diagram of interleaved memory.

FIG. 10 illustrates an embodiment of the present invention using an interleaved memory. In this embodiment, a first bank of memory 300 (bank0) and a second bank of memory 302 (bank1) are connected to the data bus 20. For a 32-bit data bus 20, each bank 300 and 302 would be operable to receive thirty-two bits of data from data bus 20. Control signals are provided to the memory banks 300 and 302 such that they store alternate 32-bit pixel words. For example, with 8-bits per pixel, bank0 would store pixel word 0 (comprising pixels 0-3) and bank1 would store pixel word 1 (comprising pixels 4-7). Bank0 would store pixel word 2 (comprising pixels 8-11), bank1 would store pixel word 3 (comprising pixels 12-15), and so on. Interleaving is commonly used in graphic system in order to make possible a higher pixel output bandwidth. While FIG. 10 illustrates a two-bank interleave, any number of banks can be used, without departing from the scope of the present invention.

Figure 11:
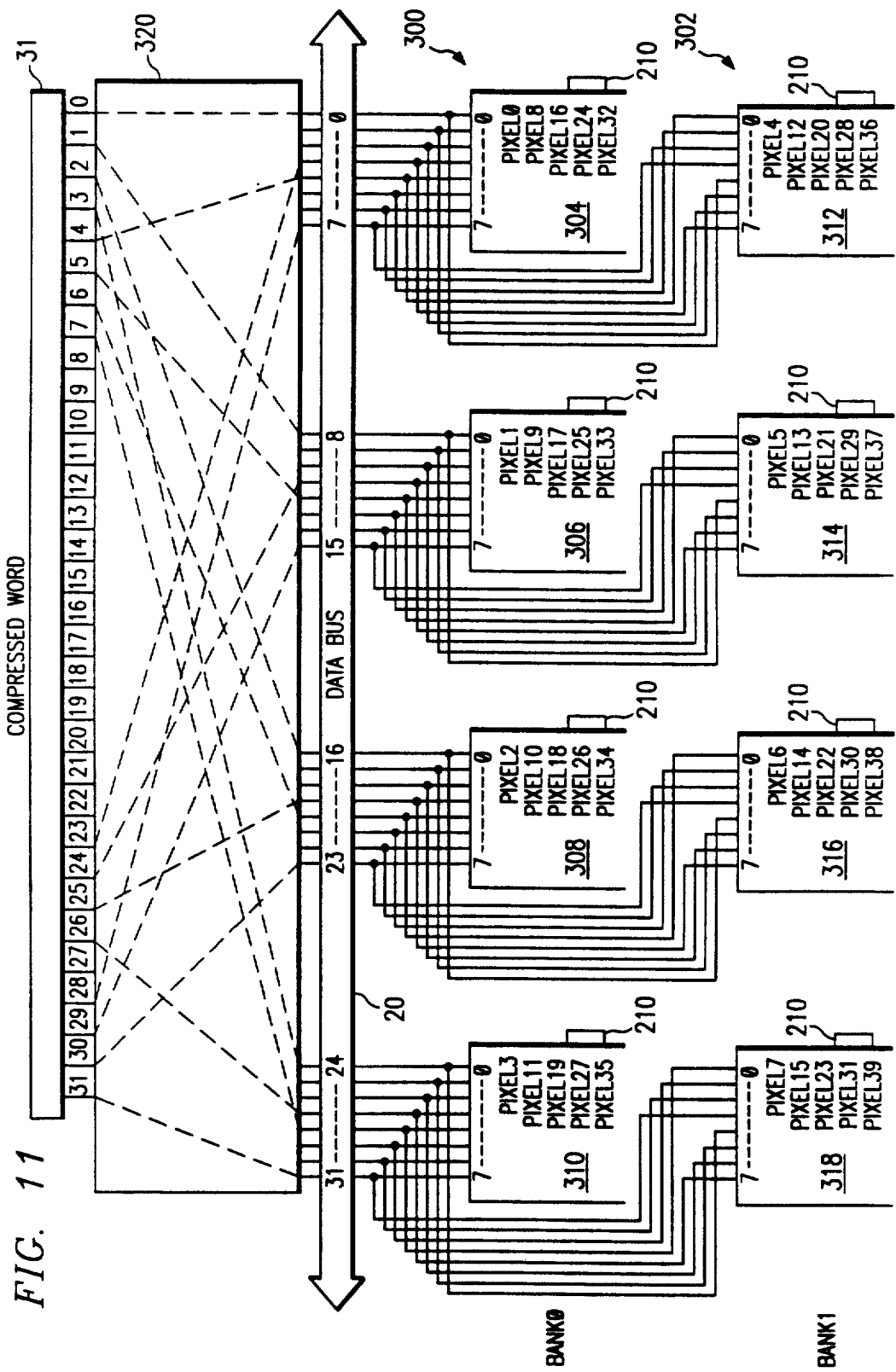
FIG. 11 shows a circuit for using interleaved memory in a block-write mode, including partial connections for an associated swizzle circuit.

FIG. 11 illustrates a block diagram of the present invention for use with the block-write mode described above. Bank0 300 comprises VRAMs 304, 306, 308 and 310. In this embodiment, VRAMs 304-310 have a width of 8-bits, for example, VRAMs 304-310 comprise 128K×8 VRAMs. Similarly, bank1 302 comprises VRAMs 312, 314, 316 and 318, which also have an 8-bit width.

In the prior art, corresponding VRAMs (304 and 312, 306 and 314, 308 and 316, and 310 and 318) would have corresponding input nodes connected to the same lead on the data bus 20. For example, data bus lead "0" would be connected to node "0" of VRAM 304 and node "0" of VRAM 312. However, in block-write mode, this configuration would pose a serious problem. In this configuration, corresponding VRAMs would have the same block-write function performed thereon. For example, if the data register 210 was to be written to pixels 0, 8 and 24, then the data in register 210 of VRAM 312 would also be written to pixels 4, 12 and 28 of VRAM 312.

In the present invention, the inputs to corresponding VRAMs are configured to avoid this problem. Each VRAM 304-318 has four input nodes which determine which four pixels will be written to. In the illustrated embodiment, these input nodes are input nodes 0-3 of each VRAM. The remaining four input nodes 4-7 are "don't care" nodes, i.e., these nodes have no function in block-write mode. The data bus 20 is connected to the VRAMs such that four data bus leads are connected to the "do care" input nodes of one VRAM and the same leads are connected to the "don't care" of the corresponding VRAM. Hence, bus lead 0-3 are connected to input nodes 0-3 of VRAM 304 and to input nodes 4-7 of VRAM 312. Similarly, data bus leads 4-7 are connected to input nodes 4-7 of VRAM 304 and to input nodes 0-3 of VRAM 312. Hence, data bus leads 0-3 control block-write functions for VRAM 304 and bus leads 4-7 control block-write functions for VRAM 312. Conversely, bus leads 0-3 do not affect block-write functions for VRAM 312 and bus leads 4-7 do not affect block-write functions for VRAM 304. The connections between bus leads and VRAM input nodes is shown in FIG. 13.

The swizzle circuit 320 provides connections between the data source 31 and the data bus 20. The connections of the swizzle circuit 320 are partially shown in FIG. 11; complete connections for the swizzle circuit 320 are illustrated in FIG. 12. The swizzle circuit illustrated in FIGS. 11 and 12 is appropriate for the connections between the data bus and the VRAMs as illustrated in FIGS. 11 and 13; however, other swizzle circuit configurations could be designed to accommodate different connections between the data bus 20 and the VRAMs. Further, it should be noted that the circuitry for providing multiple swizzle configurations and the duplicate/expansion circuit could be used with the interleaved memory configuration of FIGS. 10-13.

As illustrated, the block-write function simultaneously writing to the two banks of interleaved memory allows total data rate of 256-bits/cycle, twice the data rate of the non-interleaved configuration.

Although the present invention has been illustrated in connection with VRAMs having four "do care" and four "don't care" input nodes, other VRAM designs could be accommodated within the scope of the present invention. For example, a two bank interleave memory system could use 16-bit width VRAMS having eight "do care" and eight "don't care" input nodes.

It should be noted that the rearrangement of the bank1 connections to the data bus requires a change in the connections to the data out bus 15, such that the output data arrives in the correct sequence on the data out bus 15.

While the discussion has referred to the block-write mode as it relates to VRAMs, it should be understood that the same type of memory operations could be added to memories not specifically intended to support video.

Although the present invention has been described with respect to a specific preferred embodiment thereof, various changes and modifications may be suggested by one skilled in the art, and it is intended that the present invention encompass such changes and modifications as fall within the scope of the appended claims.

What is claimed is:

1. A processing system, supporting block-write functions, comprising:

first and second interleaved banks of memories, said first and second interleaved banks of memories each including an identical predetermined number of memories, each memory having a block-write data register, each memory addressable in a normal mode and a block-write mode and each memory having a plurality of input nodes for receiving data in said normal mode, a first subset of said input nodes operable to receive control data in said block-write mode controlling writing of data into said memory from said block-write data register and a second subset of said input nodes not used in said block-write mode;

a multi-lead output bus; and coupling circuitry operable to couple ones of said output bus leads to input nodes of said first subset of said first bank of memories and to inputs nodes of said second subset of said second bank of memories.

2. The processing system of claim 1 wherein said coupling circuit is further operable to couple other ones of said output bus leads to input nodes of said first subset of said second bank of memories and to input nodes of said second subset in said first bank of memories.

3. The processing system of claim 1 and further comprising:

a multi-lead input bus for receiving data from an external source; and reordering circuitry for passing data from said leads of said input bus to certain leads of said output bus when data is presented to said memories in normal mode and for passing control data from said leads of said input bus to certain other leads of said output bus when control data is presented to said memories in a block-write mode.

4. The processing system of claim 3 wherein said reordering circuitry is a multiplex circuit.

5. The processing system of claim 3 wherein said reordering circuitry includes a memory having a look-up table for the association of input leads to output leads.

6. The processing system of claim 3 wherein said reordering circuitry includes circuitry for passing data from individual input leads to multiple output leads.

7. The processing system of claim 3 wherein said memories contain video display pixel data, and wherein said reordering circuitry controls a single pixel value split between more than one memory.

8. The processing system of claim 1 wherein said first and second interleaved banks of memories each comprise n corresponding memories, each memory having m input nodes including p input nodes of said first subset and at least p input nodes of said second subset, and wherein m is equal to or greater than 2 p.

9. The processing system of claim 8 wherein said coupling circuitry is operable to couple a first subset of said leads of said output bus to respective input nodes of said first subset of each memory bank and a second subset of leads of said output bus to respective input nodes of said second subset.

10. A method of controlling block-write access in a processing system comprising the steps of:

storing data in first and second interleaved banks of memories, said first and second interleaved banks of memories each including an identical predetermined number of memories, each memory having a block-write data register, each memory addressable in a normal mode and a block-write mode and each memory having a plurality of input nodes for receiving data in said normal mode, a first subset of said input nodes operable to receive control data in said block-write mode controlling writing of data into said memory from said block-write data register and a second subset of said input nodes not used in said block-write mode; and coupling a plurality of leads of an output bus to input nodes of said first subset of said first bank of memories and to inputs nodes of said second subset of said second bank of memories.

11. The processing system of claim 10 wherein said coupling step further couples other leads of said output bus to input nodes of said first subset of said second bank of memories and to input nodes of said second subset in said first bank of memories.

12. The method of claim 1 and further comprising the steps of:

passing data from the leads of an input bus to certain leads of said output bus when data is being presented to the memories in a normal mode; and reordering control data to pass from the leads of said input bus to certain other leads of said output bus when control data is being presented to said memories in a block-write mode.

13. The method of claim 12 wherein said reordering step includes the step of accessing a memory having a look-up table for the association of input leads to output leads.

14. The method of claim 12 wherein said reordering step comprises the step of passing data from individual input leads to multiple output leads.

* * * * *